April 16, 1968 W. HOTINE 3,378,316

WEAR-COMPENSATING BEARING

Filed May 28, 1965

INVENTOR.
WILLIAM HOTINE,
By
ATTORNEY.

United States Patent Office 3,378,316
Patented Apr. 16, 1968

3,378,316
WEAR-COMPENSATING BEARING
William Hotine, Idyllwild, Calif., assignor to General Dynamics Corporation (Pomona Division), Pomona, Calif., a corporation of Delaware
Filed May 28, 1965, Ser. No. 459,783
12 Claims. (Cl. 308—26)

ABSTRACT OF THE DISCLOSURE

Broadly, this disclosure is directed to a non-lubricated, wear-compensating bearing adapted for use in difficult environments. More particularly the bearing comprises an outer race having a generally V-shaped groove or channel, which is adapted to cooperate with a complementary shaped surface on the inner race. The outer race is made of a rough surfaced metal having a layer of anti-friction plastic such as Teflon deposited on the rough retaining area of the surface. The inner race is made of a spring material and, in the embodiment illustrated, is generally tubular in form, having thereon an annular flange of generally V-shaped configuration for cooperation with the V-shaped groove of the outer race. The bearing is preloaded by providing the inner race with axially extending slots so as to facilitate radial spring loading of the inner race into the outer race.

---

This invention relates to bearings, particularly to non-lubricated wear-compensating precision bearings adapted for operation in a high vacuum.

Vacuum ball bearing applications wherein pre-loaded conventionally lubricated ball bearing assemblies supply the necessary precision are unsatisfactory because the lubricant is removed from the bearing during the evacuation process. This greatly increases the bearing friction due to the solid residue of the lubricating oil remaining in the bearing. Space applications experience the same problem. For example, the sealed gyro assemblies of certain types of missiles are exhausted to a high vacuum and it has been found that oil drawn from the ball bearings in use has been deposited as a coating on other guidance equipment of the gyro assembly, thus causing erratic operation of the missile.

Precision ball bearing assemblies also suffer damage from peening of the races under conditions of excessive shock and vibration, and have a very limited life under these conditions, which are often prevalent in servoed antenna assemblies, for example.

Accordingly, the bearing of this invention overcomes the disadvantages of prior known bearings by providing non-lubricated operation in high vacuum application and by being substantially free from shock and vibration damage.

Preloaded V-shaped bearings are known in the prior art as illustrated by U.S. Patent No. Re. 25,028. However, these prior known bearings do not provide the need, fulfilled by the novel bearing of this invention, as set forth hereinafter.

Therefore, it is an object of this invention to provide a non-lubricated bearing.

A further object of the invention is to provide a precision bearing with zero axial and longitudinal play.

Another object of the invention is to provide a non-lubricated precision bearing that will maintain its characteristics regardless of wear.

Another object of the invention is to provide a precision bearing that will maintain its characteristics and not be damaged in an environment of excessive shock and vibration.

Another object of the invention is to provide a non-lubricated bearing in which the static and running friction are substantially the same.

Another object of the invention is to provide a non-lubricated, wear-compensating, precision bearing which utilizes a surface material having a very low coefficient of friction the construction of which allows the heat generated in the surface material by friction to be quickly dissipated.

Another object of the invention is to provide a non-lubricated, wear-compensating, precision bearing having a preloaded construction.

These and other objects of the invention will become readily apparent from the following description and accompanying drawings wherein.

Figure 1:
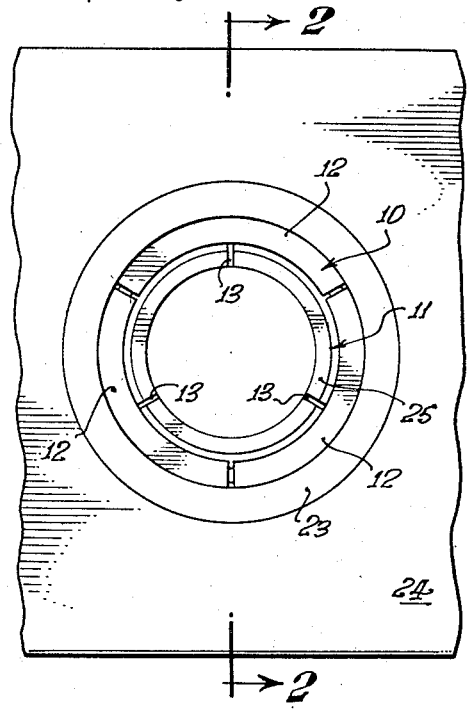
FIG. 1 is an end view of an embodiment of the invention mounted for operation.
Figure 2:
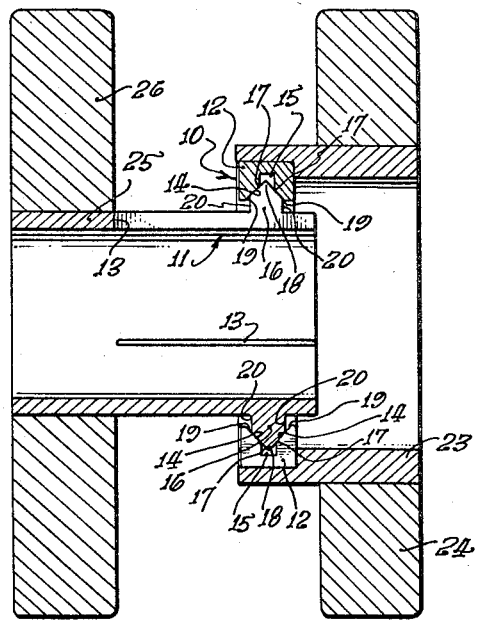
FIG. 2 is a cross-sectional view taken on the line 2—2 of FIG. 1.

Referring now to the drawings, the bearing comprises generally an outer race 10 and an inner race 11. The outer race 10 is of the segmental type and in this embodiment consists of three (3) sections or segments 12, as shown in FIG. 1, and may be constructed from any metal that is a good conductor of heat and can be pressed, cast, machined, or formed, for example an investment cast metal. The inner race 11 is split for radially preloading the bearing assembly by providing same with longitudinal slots 13, and may be fabricated from a polished hard surfaced metal such as stainless steel or hard chrome-plated metal having a satisfactory modulus of elasticity.

The outer race 10 is provided with a V-shaped groove or channel 14 having an undercut 15 at the point thereof. The inner race 11 is provided with a complementary V-shaped flange 16 having a ridge portion adapted to cooperate with groove 14 of race 10. For example, the flange 16 of race 11 may have 45° angular flanks 17 for equal axial and radial external loads. This angular form may be modified to suit the loading factors of a particular application. The undercut 15 in outer race 10 is made slightly wider than the width of ridge crest 18 of the inner race flange 16, so that the ridge portion of the flange 16 can change its radius under preload without interference regardless of wear of the mating surfaces. Also, skirts 19 of the outer race 10 extend beyond the width of straight sides 20 of the race 11 flange 16 to provide the same non-interfering action and ability of the angular bearing surfaces to be lapped or worn without creating any interference to the continued intimate contact of the bearing flanks 17 and channel 14. The flanks 17 of inner race 11 are therefore always in intimate contact with the complementary surfaces of outer race 10, regardless of wear; so there is no axial or radial play created by wear.

Figure 3:
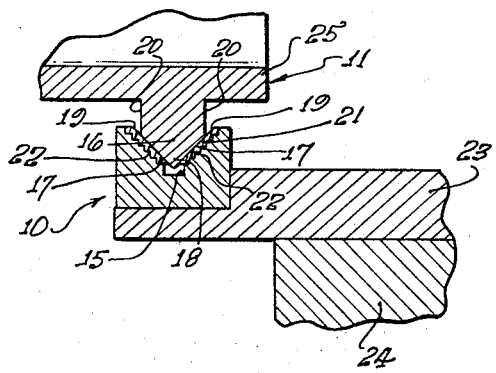
FIG. 3 is an enlarged view illustrating a portion of the FIG. 2 bearing.
Figure 4:
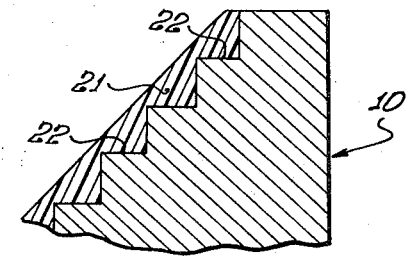
FIG. 4 is an enlarged view of a portion of FIG. 3 illustrating a manner of depositing the low coefficient of friction material on the bearing race.

The channel or groove 14 of outer race 10 is provided with a thin surface or layer of Teflon (polytetrafluoroethylene) 21 deposited in and retained on race 10 by means of a rough surface such as a series of grooves or channels indicated at 22 in FIGS. 3 and 4. The configuration of the grooves 22 is illustrative only and would be determined by the shape of the bearing surface for various applications and the ease of forming the grooves therein. The Teflon may be deposited in the grooves 22, for example, by a compression smearing and baking process, the rough surface of the channel or groove 14 serving to increase the adhesion of the Teflon thereto. Chemical adhesive means may also be employed, using a comparatively smooth surface on channel 14. Any heat generated in the Teflon layer 21 during operation by friction of this surface with the mating metal surface (flanks 17 of inner race 11) is rapidly conducted through the thin Teflon layer 21 to the underlying metal (race 10). The outer and inner races 10 and 11 are lapped together after deposit of the Teflon layer 21 to produce smoothly mating surfaces.

In assembly of the novel bearing, the sections or segments 12 of outer race 10 are assembled over the ridge portion of flange 16 of inner race 11 and then pressed into a retaining and mounting sleeve 23, which may be pressed, for example, into a gimbal ring 24 for gyro applications as illustrated. In the embodiment illustrated, the inner race 11 is formed on the exterior surface of a tubular support member 25 which is made of a suitable spring material which cooperates with slots 13 to provide radial spring loading of the inner race 11 into the outer race 10. The dimensions of the races 10 and 11 are made such as to require slight radial compression of the inner race 11 when the outer race 10 is installed into its sleeve 23. The end of support member 25 opposite slots 13 is pressed, for example, into a gimbal ring 26.

This invention provides a bearing wherein the frictional torque is low and is substantially equal for static and running friction due to the frictional characteristics of Teflon (polytetrafluoroethylene) on metal. No lubrication is needed, as heat generated by friction will be quickly conducted through the thin Teflon layer to the heat sink of the underlying metal, preventing heat damage to the Teflon bearing surface. Other suitable materials may be used, Teflon being given as an example only.

This novel bearing can be easily fabricated and has numerous advantages over loaded ball bearings in precision applications of all kinds in addition to its vacuum applitions. The bearing has a very low P-V ratio, and a frictional torque substantially less than the pre-loaded bearings it would replace in any given application, together with very low starting torque compared to ball bearings. The bearing of the invention also is not damaged by excessive shock and vibration, or by a continually oscillating or vibrating radial or axial load. It is applicable in corrosive media if the metallic portions of the bearing are fabricated from corrosion resistant materials. In addition, the bearing does not require shielding, as it is substantially unaffected by dust and dirt.

While the construction shown is specifically designed for a gimbal bearing application in a free gyro, adaptations of the bearing for other applications can be easily made.

Although a particular embodiment of the invention and particular materials therefor have been illustrated and described, modifications and changes will become apparent to those skilled in the art, and it is intended to cover in the appended claims all such modifications as come within the true spirit and scope of the invention.

What I claim is:

1. A bearing comprising inner and outer races, said outer race comprising a plurality of segments, each of said segments being provided with a substantially V-shaped channel cooperating with a substantially V-shaped flange of said inner race, each of said channels being provided with a thin layer of material having a low coefficient of friction, each of said channels being provided with grooves for retaining said material thereon, said inner race being provided with slot means for spring loading of said inner race with respect to said outer race.

2. A bearing comprising inner and outer annular races, said outer race comprising a plurality of segments each provided with a channel cooperatively receiving a complementary shaped flange of said inner race, said outer race being provided with a thin layer of polytetrafluoroethylene which abuts said inner race flange, means provided on each of said channels for retaining said layer of polytetrafluoroethylene against the surface thereof, and slotted means on said inner race for preloading said inner race in said outer race.

3. A non-lubricated, wear-compensating bearing adapted for use in evacuated environments comprising: an outer race having a generally V-shaped groove which cooperates with a complementary shaped surface on an inner race, said outer race having a thin layer of polytetrafluoroethylene deposited on the surface of said V-shaped groove, said inner race being made of a spring material and having a generally V-shaped annular flange thereon defining said complementary shaped surface, and means for pre-loading said inner race in said outer race including axially extending slots in said inner race.

4. A non-lubricated bearing adapted for gimbal and spin applications in a free gyro comprising annular inner and outer races, said outer race being composed of a plurality of segments and defining an annular V-shaped groove therein, said inner race including an annular flange having a portion thereof of complementary shape to said annular V-shaped groove of said outer race, and a thin layer of material having a low coefficient of friction secured to each of said outer race segments and separating said inner race flange portion and said outer race groove, said outer race including means for retaining said material adjacent said groove, said inner race being provided with means for preloading said inner race in said outer race.

5. The bearing defined in claim 4, wherein said outer race is additionally provided with an annular undercut at the inner end of said annular groove, said undercut being greater in width than the width of the crest of said inner race flange portion.

6. The bearing defined in claim 4, wherein said annular groove includes outer end portions which extend beyond the width of said inner race flange portion.

7. The bearing defined in claim 4, wherein said material retaining means includes a plurality of annular channels on the side surfaces of said outer race annular groove.

8. The bearing defined in claim 4, wherein said material is polytetrafluoroethylene.

9. A non-lubricated pre-loaded bearing for use in evacuated environments comprising: an annular outer race composed of a plurality of sections, said annular race having an annular V-shaped channel therein, an annular undercut at the point of said V-shaped channel, and a plurality of groove members on the skirt portions of said channel; a thin layer of material having a low coefficient of friction retained adjacent said channel side surfaces by said groove members; and an annular inner race having an annular flange defining a pair of straight side surfaces and a V-shaped end portion complementing said annular race V-shaped channel, and a plurality of longitudinal slots adapted for providing pre-loading of said inner race within said outer race; said annular undercut of said outer race having a width greater than the width of the flange V-shaped end portion crest of said inner race; said annular V-shaped channel skirt portions extending beyond the width of said straight side surfaces of said inner race flange.

10. The bearing defined in claim 9, wherein said material is polytetrafluoroethylene.

11. The bearing defined in claim 9, wherein said outer race is constructed of a metal having a heat conductive characteristic capable of conducting heat generated in said material away from said material.

12. The bearing defined in claim 11, wherein said inner race is constructed of a hard surfaced metal having an elasticity characteristic capable of maintaining radial preloading of the bearing.

References Cited

UNITED STATES PATENTS

| | | | |
|---|---|---|---|
| 478,292 | 7/1892 | Simcox | 308—63 X |
| 1,952,379 | 3/1934 | Lee | 308—3 |
| 2,307,874 | 1/1943 | Bilde. | |
| 2,330,635 | 9/1943 | Siebel. | |
| 2,504,960 | 4/1950 | Brandon | 308—37 X |
| 2,652,295 | 9/1853 | Wollin | 308—37 X |
| 2,719,761 | 10/1955 | Bonnafe | 308—3 |
| 2,952,144 | 9/1960 | Holmes | 308—72 |
| 3,063,761 | 11/1962 | Hoddy et al. | 308—72 |
| 3,167,366 | 1/1965 | Freund | 308—238 |
| 3,243,239 | 3/1966 | Hackman | 308—26 |

FOREIGN PATENTS 581,546  10/1946  Great Britain.

MARTIN P. SCHWADRON, *Primary Examiner.*

FRANK SUSKO, *Examiner.*

R. F. HESS, *Assistant Examiner.*